United States Patent
Takei et al.

(10) Patent No.: US 6,321,572 B1
(45) Date of Patent: Nov. 27, 2001

(54) VACUUM DEGASSING APPARATUS FOR MOLTEN GLASS

(75) Inventors: Yusuke Takei, Tokyo; Masataka Matsuwaki, Kanagawa; Yasuharu Hirabara, Kanagawa; Takashi Kijima, Kanagawa; Mitsuo Sugimoto, Kanagawa, all of (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/315,163

(22) Filed: May 20, 1999

(30) Foreign Application Priority Data

Jun. 10, 1998 (JP) .................................................. 10-162163

(51) Int. Cl.[7] .................................................. C03B 5/225
(52) U.S. Cl. ............................................. 65/157; 65/346
(58) Field of Search ............................. 65/134.2, 157, 65/325, 346, 374.13

(56) References Cited

U.S. PATENT DOCUMENTS

| | | | |
|---|---|---|---|
| Re. 36,082 | * 2/1999 | Ishimura et al. | 65/32.5 |
| 1,568,308 | 8/1926 | Pike . | |
| 3,519,412 | 7/1970 | Olink . | |
| 5,316,563 | 5/1994 | Ishimura et al. . | |
| 5,820,652 | * 10/1998 | Bernard et al. | 65/325 |
| 5,849,058 | 12/1998 | Takeshita et al. . | |
| 5,851,258 | 12/1998 | Ando et al. . | |
| 6,119,484 | * 9/2000 | Takei et al. | 65/134.2 |

FOREIGN PATENT DOCUMENTS

| | | |
|---|---|---|
| 0 759 524 | 2/1997 | (EP) . |
| 0 775 671 A1 | * 5/1997 | (EP) . |
| 0 908 417 | 4/1999 | (EP) . |
| 2-221129 | 9/1990 | (JP) . |
| 3-33020 | 2/1991 | (JP) . |
| 3-69516 | 3/1991 | (JP) . |
| 4-31325 | 2/1992 | (JP) . |
| 5-58646 | 3/1993 | (JP) . |
| 5-208830 | 8/1993 | (JP) . |
| 5-208845 | 8/1993 | (JP) . |
| 5-229831 | 9/1993 | (JP) . |
| 6-305735 | 11/1994 | (JP) . |
| 9-59029 | 3/1997 | (JP) . |
| 11 130444 | 5/1999 | (JP) . |

* cited by examiner

Primary Examiner—Sean Vincent
(74) Attorney, Agent, or Firm—Oblon, Spivak, McClelland, Maier & Neustadt, P.C.

(57) ABSTRACT

A vacuum degassing apparatus includes a lifter to absorb deformation in a vertical direction due to thermal expansion of the vacuum degassing, a slider to absorb thermal expansion of the vacuum degassing vessel in a longitudinal direction thereof, or a thermal expansion absorbing layer to absorb thermal expansion of an uprising pipe and a downfalling pipe in a cross-sectional direction, or a thermal expansion absorbing layer provided along a portion of an outer surface of the vacuum degassing vessel in a height direction.

10 Claims, 3 Drawing Sheets

VACUUM DEGASSING APPARATUS FOR MOLTEN GLASS

FIELD OF THE INVENTION

The present invention relates to a vacuum degassing apparatus for molten glass, which removes bubbles from molten glass continuously supplied.

DISCUSSION OF THE BACKGROUND

In order to improve the quality of formed glass products, there has been used a vacuum degassing apparatus which removes bubbles generated in molten glass before the molten glass that has been molten in a melting tank is formed by a forming apparatus, as shown in FIG. 3.

The vacuum degassing apparatus 110 shown in FIG. 3 is used in a process wherein molten glass G in a melting tank 120 is vacuum-degassed and is continuously supplied to a subsequent treatment vessel. In the vacuum degassing apparatus are provided a vacuum housing 112 which is evacuated to be depressurized therein, a vacuum degassing vessel 114 which is provided in the vacuum housing 112 and is depressurized together with the vacuum housing, and an uprising pipe 116 and a downfalling pipe 118 which are connected to respective ends of the vacuum degassing vessel in a downward and vertical direction. The uprising pipe 116 has a lower end immersed in the molten glass G in an upstream pit 122 in communication with the melting tank. Likewise, the downfalling pipe 118 has a lower end immersed in the molten glass G in a downstream pit 124 in communication with the subsequent treatment vessel (not shown).

The vacuum degassing vessel 114 is substantially horizontally housed in the vacuum housing 112 which is evacuated by a vacuum pump (not shown) to be depressurized therein. Since the inside of the vacuum degassing vessel 114 is depressurized to a pressure of $\frac{1}{20}$–$\frac{1}{3}$ atmosphere together with the inside of the vacuum housing 112, the molten glass G in the upstream pit 112 before degassing is sucked and drawn up by the uprising pipe 116, and is introduced into the vacuum degassing vessel 114. After the molten glass has been vacuum-degassed in the vacuum degassing vessel 114, the molten glass is drawn down by the downfalling pipe 118 to be taken out into the downstream pit 124.

In order to evacuate the inside of the vacuum housing 112 through a suction port 112c by the vacuum pump or the like (not shown) to depressurize the inside of the vacuum degassing vessel 114 to a certain pressure and to maintain the depressurized state, the vacuum degassing vessel 114 has an upper portion formed with suction ports 114a, 114b to be open toward the inside of the vacuum housing 112.

Around the vacuum degassing vessel 114, the uprising pipe 116 and the downfalling pipe 118 in the vacuum housing 112 is provided thermal insulation material 130, such as refractory bricks, to cover these members for thermal insulation.

Since the conventional vacuum degassing apparatus 110 is constructed to deal with the molten glass G having a high temperature, such as a temperature at 1,200–1,4000° C., paths for the molten glass in direct contact with the molten glass G, such as the vacuum degassing vessel 114, the uprising pipe 116 and the downfalling pipe 118, are constituted by circular shells which are made of noble metal, such as platinum and platinum alloy, as shown in JP-A-2221129.

The reason why the paths for molten glass, such as the vacuum degassing vessel 114, the uprising pipe 116 and the downfalling pipe 118, are made of noble metal, such as platinum and platinum alloy, is that there is no inclusion of impurities into the molten glass G and a certain strength is ensured at high temperatures since it is hardly possible due to low reactivity of the noble metal with the molten glass at a high temperature that, when the noble metal contacts the molten glass G at a high temperature, the noble metal elutes by reaction with the molten glass G.

When the paths for molten glass, such as the vacuum degassing vessel 114, the uprising pipe 116 and the downfalling pipe 118, are made of noble metal, such as platinum and platinum alloy, the following problems are created especially in building the vacuum degassing apparatus 110 in a large size:

(1) It is required that the temperature of the molten glass G at the inlet of the vacuum degassing apparatus 110 be not higher than 1,400° C.

When the temperature is higher than 1,400° C., the strength of the noble metal lowers. In order to set the temperature at a temperature not higher than 1,400° C., the temperature in the melting vessel 120 can not be raised. This could lead to insufficient elution of glass material in the melting vessel 120.

(2) The cost greatly increases.

In order to deal with a large quantity of molten glass, the sectional area of the paths is required to be large. This requires that the wall of the paths be thick to maintain the required strength for the paths, remarkably increasing the required quantity of the expensive noble metal and significantly raising the cost.

In terms of mainly cost reduction, a proposal has been made to constitute the paths for molten glass, such as the vacuum degassing vessel 1140, the uprising pipe 116 and the downfalling pipe 118, in the conventional vacuum degassing vessel 110 shown in FIG. 3 by refractory bricks more inexpensive than noble metal, such as platinum and platinum alloy (e.g., platinum-rhodium alloy), in order to build the apparatus in a large size and increase the degassing throughput of the molten glass.

However, there are limits to which refractory bricks are formed in a large size. It is absolutely impossible to build each of the vacuum degassing vessel 114, the uprising pipe 116 and the downfalling pipe 118 from a single refractory brick. In order to constitute the vacuum degassing vessel 114, the uprising pipe 116 and the downfalling pipe 118 of the vacuum degassing vessel 110 by refractory bricks, many refractory bricks are required to be combined. This means that joints are inevitably formed between the refractory bricks in the paths in direct contact with the molten glass.

Even if, in order to eliminate the provision of gaps at the joints of the refractory bricks, the vacuum degassing vessel, the uprising pipe and the downfalling pipe are carefully assembled using joint material and so on, thermal expansion of the refractory bricks easily creates gaps at the joints of the refractory bricks since the uprising pipe, the vacuum degassing vessel and the downfalling pipe of the vacuum degassing apparatus are heated until the temperature of the inner wall surfaces of these members reaches 1,200° C.–1,400° C. There is a possibility that the molten glass leaks through the gaps to shorten the life of the paths, and that the contact of the leaked molten glass with the thermal insulation material around the paths elutes components of the thermal insulation material to contaminate the molten glass in the paths, deteriorating the quality of glass products.

SUMMARY OF THE INVENTION

It is an object of the present invention to solve the problems and to provide a large-sized and practical vacuum degassing apparatus capable of absorbing thermal expansion of a path and the resulting thermal distortion of the path in increasing the temperature of the vacuum degassing apparatus in order to prevent the path from being broken and glass products from having deteriorated quality and of dealing with a large quantity of molten glass.

In order to attain the object, the present invention provides a vacuum degassing apparatus for molten glass, comprising a vacuum housing which is evacuated to be depressurized therein; a vacuum degassing vessel assembled by combining a plurality of refractory bricks in the vacuum housing; an uprising pipe assembled by combining a plurality of refractory bricks, the uprising pipe communicating with the vacuum degassing vessel in the vacuum housing to suck and draw up undegassed molten glass and to introduce the molten glass into the vacuum degassing vessel; a downfalling pipe assembled by combining a plurality of refractory bricks, the downfalling pipe communicating with the vacuum degassing vessel in the vacuum housing to draw down and take out the degassed molten glass; and a thermal expansion absorber to absorb thermal expansion in at least one of the uprising pipe, the downfalling pipe and the vacuum degassing vessel. The expression "to absorb thermal expansion" covers the meaning of "to release thermal expansion" as well.

It is preferable that the thermal expansion absorber is a lifter to lift at least one portion of the vacuum degassing vessel in accordance with a quantity of the thermal expansion so as to absorb thermal expansion of the vacuum degassing vessel in a vertical direction, the vacuum degassing vessel being provided in a horizontal direction.

It is preferable that the thermal expansion absorber includes a path slider to freely slide at least one portion of the vacuum degassing vessel in a longitudinal direction of the vacuum degassing vessel so as to absorb thermal expansion of the vacuum degassing vessel in the longitudinal direction of the vacuum degassing vessel.

It is preferable that the thermal expansion absorber is a thermal expansion absorption layer provided around the uprising pipe and/or the downfalling pipe, the thermal expansion absorption layer being made of filled ceramic fibers.

It is preferable that the thermal expansion absorber is a thermal expansion absorption layer provided along a portion of an outer surface of the vacuum degassing vessel in a height direction to absorb thermal expansion of the vacuum degassing vessel at that portion, the thermal expansion absorbing layer being made of filled ceramic fibers.

DESCRIPTION OF THE PREFERRED EMBODIMENTS

Figure 1:
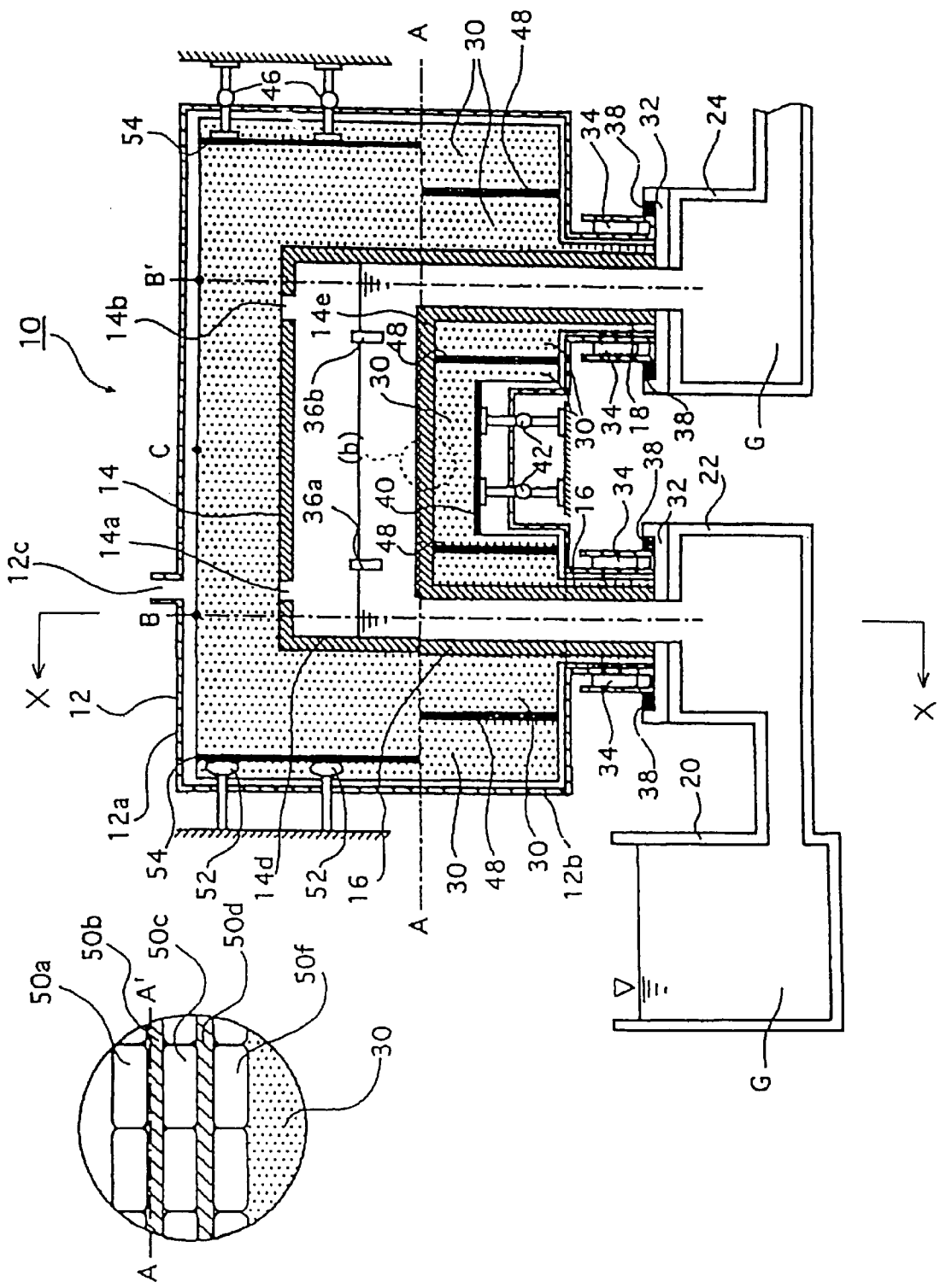
FIG. 1(a) is a schematic cross-sectional view of the vacuum degassing apparatus for molten glass according to an embodiment of the present invention.
FIG. 1(b) is a schematic cross-sectional view of an essential portion of a vacuum degassing vessel forming a part of the vacuum degassing apparatus.

Now, the vacuum degassing apparatus according to the present invention will be described in detail, referring to an appropriate embodiment shown in the accompanying drawings.

In FIG. 1(a) is shown a schematic cross-sectional view of the vacuum degassing apparatus according to the embodiment of the present invention The vacuum degassing apparatus 10 comprises a rectangular arched vacuum housing 12, a vacuum degassing vessel 14 horizontally provided in the vacuum housing 12, and an uprising pipe 16 and a downfalling pipe 18 vertically provided in the vacuum housing 12, the uprising pipe and the downfalling pipe having respective upper portions connected to right and left portions of the vacuum degassing vessel 14.

The vacuum degassing apparatus 10 is used in a process wherein molten glass G in a melting vessel 20 is vacuum-degassed and is continuously supplied to a subsequent treatment vessel, not shown, for example, a forming treatment vessel for plate glass, such as a floating bath, and a forming treatment vessel for bottles.

The vacuum housing 12 works as a pressure vessel to ensure airtightness when depressurizing the vacuum degassing vessel 14. In the shown example, the vacuum housing is formed in a substantially rectangular arched shape so as to surround the vacuum degassing vessel 14, the uprising pipe 16 and the downfalling pipe 18. The vacuum housing 12 includes thermal insulation material 30 at regions around outer surfaces of the vacuum degassing vessel 14, the uprising pipe 16 and the downfalling pipe 18. The thermal insulation material is made of air-permeable refractory bricks, which not only insulate a high temperature of the molten glass G but also provides no bar to evacuate the vacuum degassing vessel 14. Although there are no limitations on the material and the structure of the vacuum housing 12 as long as the vacuum housing have a required strength and provides airtightness required for the vacuum degassing vessel 14, it is preferable that the vacuum housing is made of plain steel, in particular stainless steel or heat-resisting steel.

The vacuum housing 12 has an upper portion formed with a suction port 12c to depressurize the inside of the vacuum housing by evacuation. The inside of the vacuum housing 12 is evacuated and depressurized by a vacuum pump, not shown, and the inside of the vacuum degassing vessel 14 provided at a substantially central portion of the vacuum housing can be maintained at a certain pressure, being depressurized to a pressure of $1/20$–$1/3$ f atmosphere for instance.

The vacuum degassing vessel 14 is horizontally provided in the substantially central portion of the vacuum housing 12. The sectional shape of the path for molten glass in the vacuum degassing vessel 14 is rectangular. Although the sectional shape of the vacuum degassing vessel may be circular as in the conventional vacuum degassing apparatus, the sectional shape is preferably rectangular in terms of vacuum-degassing treatment of the molten glass G in a large quantity and production of electro-cast bricks or dense burned refractory bricks forming the vacuum degassing vessel 14. When the inner width of the path is too large to produce refractory bricks having a size not less than the inner width, it is preferable that the ceiling of the path is formed in an arched shape.

The vacuum degassing vessel 14 has an upper portion formed with suction ports 14a, 14b open to the inside of the vacuum housing 12 to depressurize the inside of the vacuum degassing vessel 14 to a certain pressure ($1/20$–$1/30$ atmosphere) and maintain the inside at that pressure by evacuating the vacuum housing 12 through the suction port 12c by the use of the vacuum pump and so on (not shown). The vacuum degassing vessel 14 has a barrier 36a and a barrier 36*b* provided therein to block rising bubbles in the molten glass G and break the bubbles.

The upper portion of the uprising pipe 16 and the upper portion of the downfalling pipe 18 are connected to the left end portion and the right end portion of the vacuum degassing vessel 14, respectively, in a downward and vertical direction. The uprising pipe 16 and the downfalling pipe 18 have lower ends provided flush with lower ends of legs of the vacuum housing 12 in the rectangular arched shape. The lower ends of the uprising pipe and the downfalling pipe are carried on top portions of an upstream pit 22 with the molten glass G filled therein and a downstream pit 24 with the molten glass G filled therein, interposing lower receiving bricks 32 between the lower ends of the uprising and downfalling pipes and the top portions of the upstream and downstream pits.

This arrangement eliminates the need for suspending for supporting the vacuum degassing vessel 14, the uprising pipe 16 and the downfalling pipe 18 by the vacuum housing 12 all the time. This arrangement also eliminates an extremely difficult operation to lift the entire apparatus even by 1 m, which is required for maintenance, repair or replacement of the conventional vacuum degassing apparatus 110 with noble metal alloy, such as platinum alloy, used therein.

The vacuum housing 12 is divided into an upper vacuum housing 12*a* and a lower vacuum housing 12*b* at a horizontal plane indicated by the line A–A' in FIG. 1(*a*) (hereinbelow, referred to as the cut plane A–A').

The path walls of the uprising pipe 16, the vacuum degassing vessel 14 and the downfalling pipe 18 have a multi-layered cross-sectional structure as shown in FIG. 1(*b*). The multi-layered cross-sectional structure includes an inner surface brick layer 50*a*, a first backup brick layer 50*c*, a ramming material layer 50*b*, a second backup brick layer 50*f* and a ramming material layer 50*d*. The inner surface brick layer 50*a*, which forms the inner wall surface of the paths in direct contact with the molten glass G, is built by assembling refractory bricks. The first backup brick layer 50*c*, which serves as a backup for the inner surface brick layer 50*a*, is provided behind the inner surface brick layer 50*a* so as to be apart from the inner surface brick layer by a certain distance and is built by assembling refractory bricks. The ramming material layer 50*b* comprises ramming material filled in between the inner surface brick layer and the first backup brick layer. The second backup brick layer 50*f*, which serves as a backup for the first backup brick layer 50*c*, is provided behind the first backup brick layer 50*c* so as to be apart from the first backup brick layer by a certain distance and is built by assembling refractory bricks. The ramming material layer 50*d* comprises ramming material filled in between the first backup brick layer and the second backup brick layer.

Although the multi-layered cross-sectional structure is a five-layered structure in this embodiment, another multi-layered structure, such as a three-layered structure and a seven-layered structure, may apply. Although there are no limitations on the layered cross-sectional structure, it is required that at least the bottom of the vacuum degassing vessel 14 have a structure in section constituted by at least the inner surface brick layer 50*a*, the ramming material layer 50*b* and the first backup brick layer 50*c* in connection with a slider for the vacuum degassing vessel 14 explained layer, as shown in FIG. 1(*b*).

It is preferable that the refractory bricks used to form at least paths in direct contact with the molten glass G among the successive paths in the vacuum degassing vessel 14, the uprising pipe 16 and the downfalling pipe 18 are dense refractory bricks in the present invention. Any dense refractory bricks may be applied to the inner surface brick layer 50*a* for the paths in direct contact with the molten glass G as long as the bricks can be shaped so as to be matched with the shape of the paths, the bricks have a high density, elusion of the bricks into the molten glass G does not degrade the quality of glass products, preferably the reaction of the bricks to the molten glass G is small and the bricks per se is difficult to be eroded by the molten glass G. Examples of such dense refractory bricks are electro-cast bricks and dense burned bricks.

Examples of the electro-cast refractory material are zirconia based electro-cast bricks, alumina-based electro-cast refractory bricks, and AZS ($Al_2O_3$—$ZrO_2$—$SiO_2$) based electro-cast bricks.

On the other hand, as the dense burned bricks, any highly corrosion resistant burned bricks may be used. For example, dense zircon based burned bricks such as dense zircon having a dense structure, dense alumina based burned bricks such as dense alumina and dense zirconia-mullite based burned bricks may be mentioned.

By providing path surfaces with such dense refractory bricks assembled in layers, the erosion of the path surfaces by the molten glass G can be retarded.

Further, the ramming material to be filled in the ramming material layer 50*d* is a type of castable refractories applicable by adding a small amount of water to a powdery refractory having refractory aggregates, a hardening agent and the like mixed, followed by casting the powdery refractory or the like. Necessary strength of the ramming material is obtained by ceramic bonding created by heating. As the ramming material, for example, alumina based ($Al_2O_3$) ramming material, zircon based ($ZrO_2$—$SiO_2$) ramming material, and zir-mull based (AZS; $Al_2O_3$—$ZrO_2$—$SiO_2$) ramming material may be mentioned. As the preferred specific examples, CMP-AH as the alumina based material, ZR-2000 as the zircon based material, and ZM-2500 as the zir-mull based material (manufactured by Asahi Glass Company Ltd.) may be mentioned. In addition to the above, the ramming material may include the cement disclosed in JP-B-57-2666, which comprises an alumina slag of iron manufacturing containing calcium monoaluminate, calcium dialuminate or calcium silicoaluminate as a main component, an alkaline earth inorganic maiteral such as calcium monoaluminate-type alumina cement, calcium dialuminate-type alumina cement or silicoalumina cement or a high-temperature burned magnesia, ultrafine powder such as silica, chromium oxide or alumina, and inactive fillers, and are less in the calcium content and the added water content as compared with conventional ones, and excellent in the heat resistance and the errosion resistance, and has a high strength. Among such ramming material, it is preferred to use a castable refractory called a ramcrete for which a slight amount of binding material comprising an active ultrafine powder, is used. An example of effective ramming material is one called low cement type ramming material. The low cement type ramming material includes a ultrafine powder base, can be extremely densely filled by addition of water as small as 3–6 wt % and by vibrator application, and exhibits superior physical properties in terms of corrosion resistance and thermal resistance. An appropriate specific example is WHITE RAM (manufactured by Asahi Glass Company Ltd.).

As explained, the paths comprise the inner surface brick layer 50*a*, the ramming material layer 50*b* with ramming material filled therein, and the first backup brick layer 50c. Even if the molten glass G has completely eroded the inner surface brick layer 50a of the paths, the amount of the ramming material that elutes as impurities in the molten glass G can be minimized to prevent the quality of glass products from being degraded since the ramming material filled in the ramming material layer 50b is highly corrosion-resistant.

In the vacuum housing 12, the thermal insulation material 30 is provided outside the successive paths of the vacuum degassing vessel 14, the uprising pipe 16 and the downfalling pipe 18 in order to thermally insulate the paths at a high temperature with the molten glass G flowing therein. The thermal insulation material 30 is made of air-permeable thermal insulation material so as to provide no bar to evacuation of the vacuum degassing vessel 14.

The lower receiving bricks 32 are refractory bricks that are not only used to connect the uprising pipe 16 and the downfalling pipe 18 to the upstream pit 22 and the downstream pit 24 but also provided on the upstream pit 22 and the downstream pit 24 to support the uprising pipe 16, the-downfalling pipe 18 and the lower vacuum housing 12b and bear loads thereof. The lower receiving bricks are preferably made of dense refractory bricks, which are similar to ones used in the uprising pipe 16, the vacuum degassing vessel 14 and the downfalling pipe 18.

Sealing material 38 is filled at the contacting portions of a lower end of the lower vacuum housing 12b and the lower receiving bricks 32 to provide an air seal. Since slight gaps are created at the contacting portions when the lower vacuum housing 12b is put on the lower receiving bricks 32, the sealing material 38 is provided to prevent not only the molten glass G from leaking through the gaps but also air from entering the lower vacuum housing 12b through the gaps, thereby avoiding a case wherein the depressurized state cannot be maintained in the vacuum housing 12. There are no limitations on the material of the sealing material 38. Among the castable material or mortar, ones having a thermal resistant property and an air sealing property may be used. Examples of the ones are AIRSET MORTAR, TIGHT-SEAL and ASAHI HIBOND (all manufactured by Asahi Glass Company Ltd.).

Around the lower end portions of the lower vacuum housing 12 are provided water pipes 34 to cool the lower end portions. The provision of the water pipes prevents the temperature of the lower end portions of the lower vacuum housing 12b from being excessively elevated during operation of the vacuum degassing apparatus 10, thereby avoiding a case wherein the strength of the metallic material of the lower vacuum housing 12b degrades.

When the vacuum degassing apparatus 10 is heated before successively passing the molten glass G from the upstream pit 22 to the downstream pit 24 through the uprising pipe 16, the vacuum degassing vessel 14 and the downfalling pipe 18 in the vacuum degassing apparatus 10, the refractory bricks forming the paths are heated to about 1,200° C.–about 1,400° C. Heating the bricks produces unignorable thermal expansion, which generates thermal distortion in the paths per se. Since gaps between adjoining refractory bricks forming the paths are expanded by the thermal distortion, there is a possibility that the molten glass G leaks through the expanded gaps when the molten glass G flows through the paths. There is also a possibility that the thermal distortion produces a difference between the surfaces of adjoining refractory bricks as the inner surfaces of the paths to aggravate the unevenness on the inner surfaces of the paths, thereby developing damage to the paths. There is also a possibility that the molten glass G leaks through a joint at a portion with the unevenness aggravated. In order to prevent the paths from being damaged and to prolong the life of the vacuum degassing apparatus 10, the vacuum degassing apparatus 10 is provided with thermal expansion absorbers. Now, the structure of the thermal expansion absorbers will be described.

A first thermal expansion absorber is one wherein a steel plate 40 is provided on a lower portion of the horizontally arranged vacuum degassing vessel 14, or between the thermal insulation material 30 and the lower vacuum housing 12b, a plurality of jacks 42 as a lifter are provided between the steel plate 40 and the lower vacuum housing 12b, and the steel plate 40 is uniformly lifted by the jacks 42 to raise the lower portion of the vacuum degassing vessel 14. Since the jacks 42 are arranged outside the lower vacuum housing 12b, the portions of the lower vacuum housing 12b with rods of the jacks 42 passing therethrough are provided with air seal by a certain method.

The reason why the lower portion of the vacuum degassing vessel 14 is raised is as follows.

When the vacuum degassing apparatus 10 is heated to 1,200° C.–1,400° C., the refractory bricks that are piled up in a vertical direction to form the uprising pipe 16 and the downfalling pipe 18 among the paths in a rectangular arched shape are thermally expanded with the lower receiving bricks 32 for supporting the uprising pipe 16 and the downfalling pipe 18 being served as fixed ends. By the thermal expansion, the portion of the vacuum degassing vessel 14 that is higher than the uprising pipe 16 and the downfalling pipe 18 constituted by the refractory bricks piled up from the lower receiving bricks 32 in the vertical direction is also moved upwardly to create a difference between that portion and another portion of the vacuum degassing vessel 14 or to deform the vacuum degassing vessel 14.

Specific explanation will be made, referring to FIG. 1(a). The intersections of central axes of the uprising pipe 16 and the downfalling pipe 18 and an outer surface of the thermal insulation material covering the vacuum degassing vessel 14 are named B and B', respectively. The position on the outer surface of the thermal insulation material 30 that is located above the center of the vacuum degassing vessel 14 in a longitudinal direction thereof is named C. The thermal expansion at the positions B and B' in the vertical direction is caused by the thermal expansion of the upstream pipe 16 and the downstream pipe 18 constituted by the refractory bricks, and the thermal expansion at the positions B and B' is greater than the thermal expansion in the vertical direction at the position C, under which there are provided no refractory bricks piled up in the vertical direction (the thermal expansion that is caused by the wall of the vacuum degassing vessel 14 is not different between the positions B and B' and the position C, and does not contribute to the differentiation of the thermal expansion between the positions B and B' and the position C). The difference in the thermal expansion creates a difference between a portion of the inner surface brick layer 50a above the uprising pipe 16 and the downfalling pipe 18, and other portions, for example a portion of the inner surface brick layer 50a corresponding to the position C. The thermal distortion (shear distortion) caused by the difference in the thermal expansion produces a gap at a joint of the inner surface brick layer 50a of the vacuum degassing vessel 14. In order to cancel the difference or the shear distortion at the inner surface brick layer, the lifter, which can use the jacks 42 to lift the steel plate 40 in response to a quantity of the thermal expansion, locates the positions B and B' and the position C at the same level in the vertical direction. As the jacks 42, any jacks, such as screw jacks and rack driven jacks, may be used.

A second thermal expansion absorber is a device which includes a slider to slide an upper vacuum degassing vessel 14d as a part of the vacuum degassing vessel 14 in the horizontal direction along the cut plane A–A' of FIG. 1(a).

Since the vacuum degassing vessel 14 is long, it is impossible to ignore the thermal expansion of the vacuum degassing vessel 14 in the longitudinal direction when the vacuum degassing apparatus 10 is heated. On the other hand, the thermal expansion of the vacuum housing 12 is small since an increase in the temperature of the vacuum housing is small. Since the distance between the central axis B of the uprising pipe 16 and the central axis B' of the downfalling pipe 18 is little changed because of the provision of the vacuum housing 12, there is a possibility that the expansion of the vacuum degassing vessel 14 in the longitudinal direction is restrained to create distortion. In order to absorb the thermal expansion to prevent the vacuum degassing vessel 14 from distorted, there is provided the device to slide, in the longitudinal direction of the path, the upper vacuum degassing vessel 14d as an upper portion of the vacuum degassing vessel 14 separated at the cut plane A–A' shown in FIG. 1(a).

An end of the vacuum degassing vessel 14 that is connected to the downfalling pipe 18 is fixed in the horizontal direction by jacks 46 through a steel plate 54. The opposite end of the vacuum degassing vessel 14 that is connected to the uprising pipe 16 is movable, and a certain pressure is applied to the movable end by Belleville springs 52 through a steel plate 54. The reason why the pressure is applied to the upper vacuum degassing vessel 14d by the Belleville springs 52 is that even if thermal shrinkage is produced because of a decrease in the temperature of the molten glass G or another reason to shorten the length of the vacuum degassing vessel 14, the gaps at joints are difficult to expand since the certain pressure is preliminarily applied to firmly clamp the joints. Portions of the upper vacuum housing 12a with rods of the jacks 46 passing therethrough, and portions of the upper vacuum housing 12a with rods for supporting the Belleville springs 52 passing therethrough are provided with air seal to maintain the depressurized state in the vacuum housing 12.

As jacks 46, any jacks, such as screw jacks and rack driven jacks, may be used. Instead of the Belleville springs 52, different springs, such as leaf springs, may be used. Although the jacks 46 are provided on the side of the downfalling pipe 18 and the Belleville springs 52 are provided on the side of the uprising pipe 16 in this embodiment, the jacks 46 may be provided on the side of the uprising pipe 16 and the Belleville springs 52 may be provided on the side of the downfalling pipe 18, conversely.

In consideration of the thermal expansion of the vacuum degassing vessel 14 in the longitudinal direction, the length of the vacuum degassing vessel 14 is designed to be shorter than a required length so that the path in the vacuum degassing vessel 14 can smoothly connect with the uprising pipe 16 and the downfalling pipe 18 when heating the vacuum degassing apparatus 10 has been completed.

As shown in FIG. 1(a), the vacuum degassing vessel 14 is divided into the upper vacuum degassing vessel 14d and a lower vacuum degassing vessel 14e, and the upper vacuum degassing vessel 14d is slidable. The dividing plane is the cut plane A–A' shown in FIG. 1 (b) The upper vacuum degassing vessel and the lower vacuum degassing vessel are divided between the inner surface brick layer 50a and the ramming material layer 50b with ramming material filled therein in the multi-layered cross-sectional structure of the vacuum degassing vessel 14. When ramming material having a fine grain size is used, the inner surface brick layer 50a of the upper vacuum degassing vessel 14d can smooth slide on the ramming material layer 50b of the lower vacuum degassing vessel 14e by thermal expansion.

As a third thermal expansion absorber is provided a device that includes thermal expansion absorbing layers around the uprising pipe 16 and the downfalling pipe 18.

In order to restrain the erosion by the molten glass G at a high temperature, it is required that the flow rate of the hot molten glass C be reduced by increasing the diameter of the uprising pipe 16 and the downfalling pipe 18. This means that the thermal expansion of the uprising pipe 16 and the downfalling pipe 18 in a cross-sectional direction is too large to be ignored. Since the uprising pipe 16 and the downfalling pipe 18 are covered by the lower vacuum housing 12b through the thermal insulation material 30, there is a possibility that the lower vacuum housing 12b is exploded by the thermal expansion in the cross-sectional direction. Even if the lower vacuum housing is not exploded, there is a possibility that the restraint of the thermal expansion in the cross-sectional direction by the lower vacuum housing 12b produces distortion around the uprising pipe 16 and the downfalling pipe 18 to expand the gaps at joints of the refractory bricks forming the uprising pipe 16 and the downfalling pipe 18.

In order to absorb the thermal expansion to prevent thermal distortion from being produced around the uprising pipe 16 and the downfalling pipe 18, the thermal expansion absorbing layers 48 are provided. Specifically, as the thermal expansion absorbing layers 48 to cover around the uprising pipe 16 and the downfalling pipe 18, layers with ceramic wool filled therein can be provided to adsorb the thermal expansion.

The thermal expansion absorbing layers 48 are required to be thick to such an extent that the thermal expansion absorbing layers can absorb the quantity of the thermal expansion of the uprising pipe 16 and the downfalling pipe 18 at least in the cross-sectional direction.

The ceramic wool is required to be properly filled so as to avoid a case that excessive filling makes the absorption of the thermal expansion difficult. In order to absorb the thermal expansion, for example, when the thermal expansion absorbing layers 48 have a thickness of 20 mm and when the thermal expansion of the uprising pipe 16 and/or the downfalling pipe 18 in the cross-sectional is 5 mm, it is preferable that the ceramic wool is filled so as to have a density of 0.5 g/cm . There are no limitations on the ceramic wool. Any kinds of ceramic wool are acceptable as long as they are thread-like or filament-like fibers having superior thermal resistance.

Figure 2:
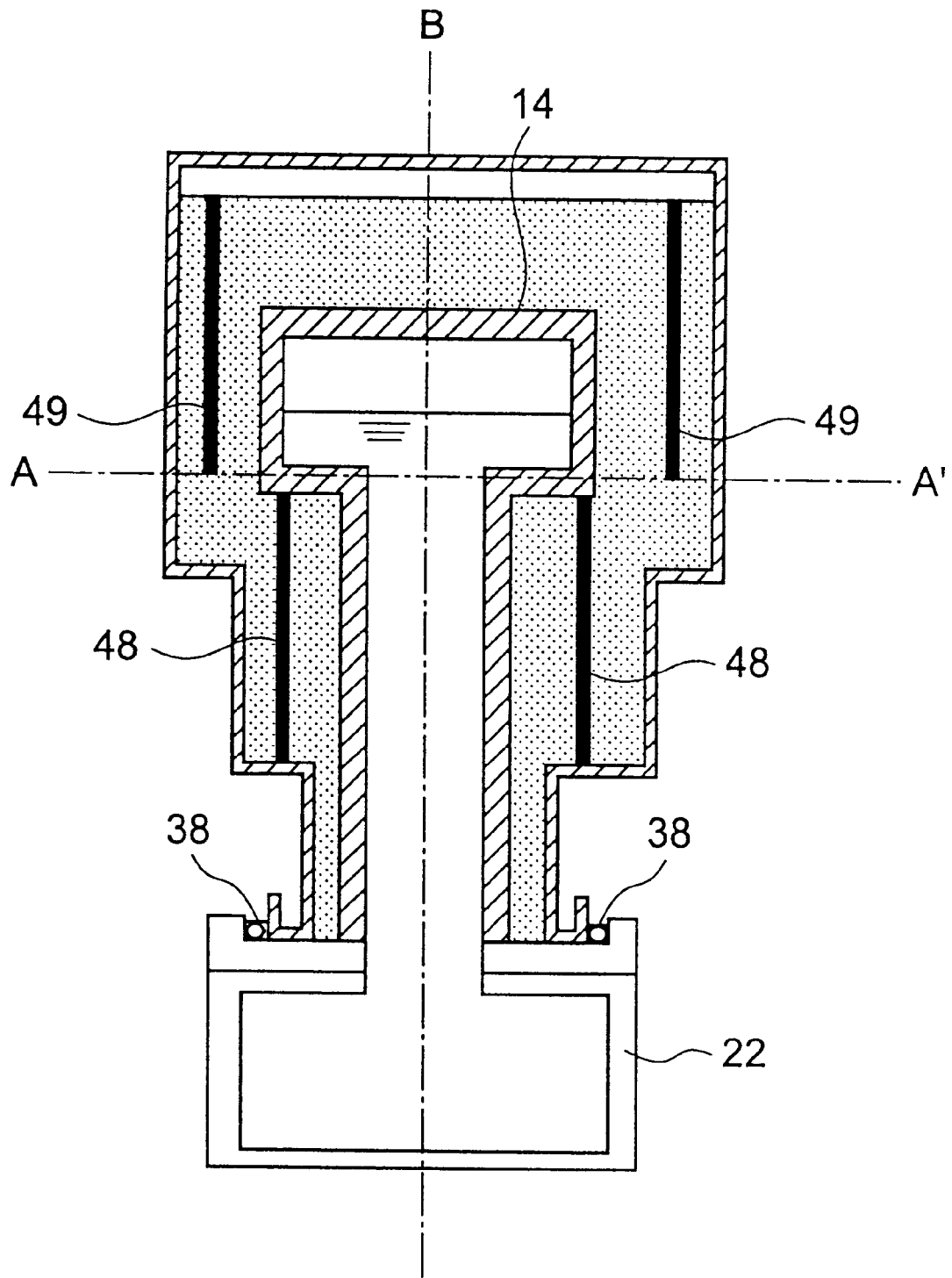
FIG. 2 is a cross-sectional view taken along the line X—X of FIG. 1.
Figure 3:
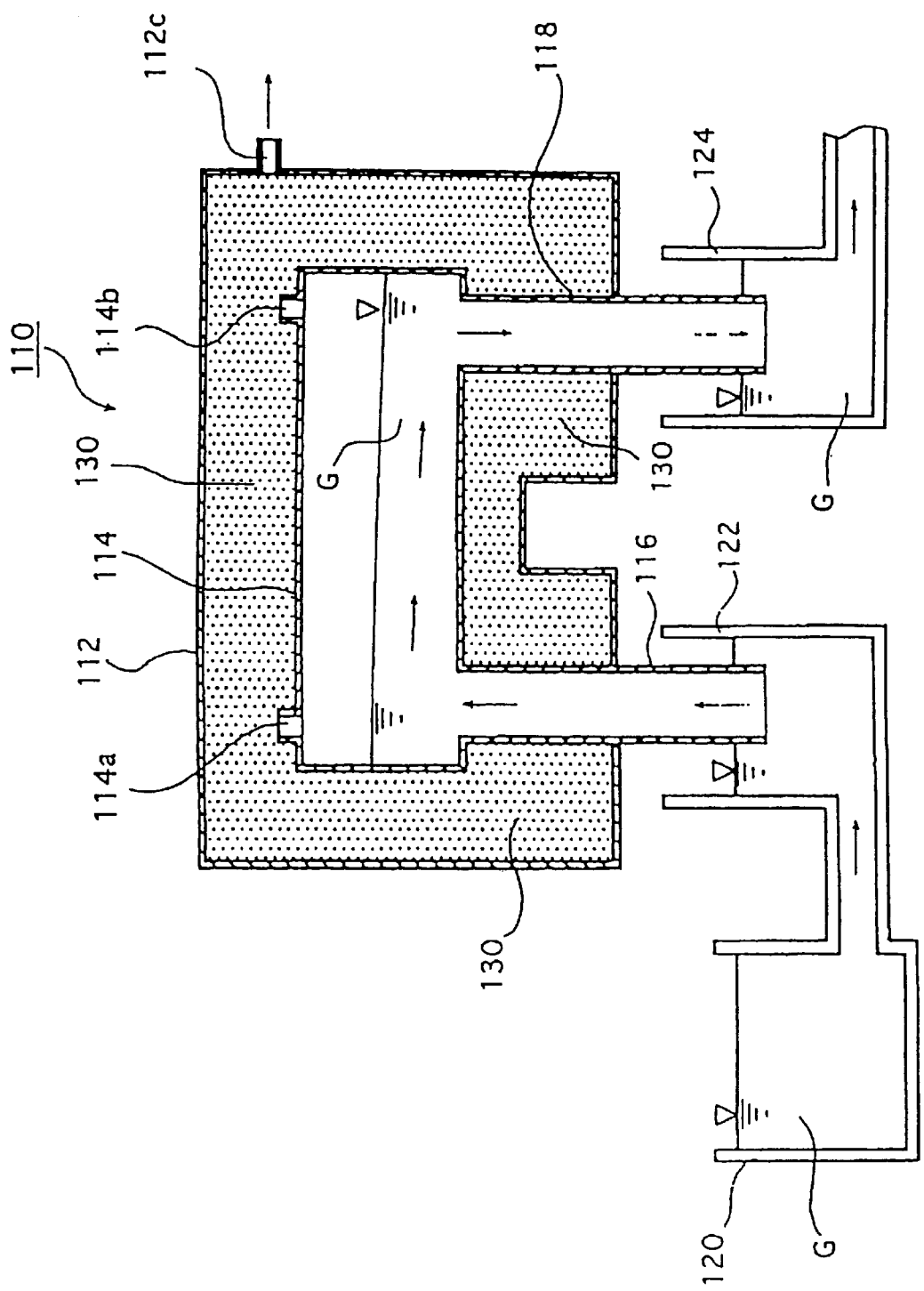
FIG. 3 is a schematic cross-sectional view of a conventional vacuum degassing apparatus for molten glass.

In FIG. 2 is shown a fourth thermal expansion absorber as the cross-sectional view taken along the line X—X of FIG. 1. The fourth thermal expansion absorber includes thermal expansion absorbing layers 49 with ceramic fibers filled therein, which are provided outside the vacuum degassing vessel 14 and at portions thereof in a height direction thereof and therealong. The thermal expansion absorbing layers 49 absorb the thermal expansion of the vacuum degassing vessel 14 in a width direction. The thermal expansion absorbing layers 49 are required to be thick to such an extent that the thermal expansion absorbing layers can absorb a quantity of thermal expansion of the vacuum degassing vessel 14 in the width direction. With regard to the material of ceramic wool and the filling degree of the ceramic wool, explanation of the thermal expansion absorbing layers 48 in the third thermal expansion absorber applies.

The vacuum degassing apparatus 10 according to the embodiment of the present invention is basically constructed as explained, and the operation of the vacuum degassing apparatus will be described.

First, the inner surfaces of the uprising pipe 16, the vacuum degassing vessel 14 and the downfalling pipe 18 are preliminarily heated to not lower than 1,200° C., for example, before starting the operation of the vacuum degassing apparatus 10. On the other hand, the molten glass G which is supplied from the melting vessel 20 is introduced from the upstream pit 22 into the downstream pit 24 by opening a bypass (not shown). When the liquid level of the molten glass G has reached a certain level, a vacuum pump (not shown) is driven to evacuate the vacuum housing 12 through the suction port 12c and the vacuum degassing vessel 14 through the suction ports 14a and 14b, depressurizing the inside of the vacuum degassing vessel 14 to a pressure of $\frac{1}{20}$–$\frac{1}{3}$ atmosphere.

As a result, the molten glass G is drawn up through the uprising pipe 16 and the downfalling pipe 18 to be introduced into the vacuum degassing vessel 14, and the molten glass G is sucked until the level difference between the molten glass G in the melting vessel 24 and that in the vacuum degassing vessel 14 reaches a certain value. The vacuum degassing vessel 14 contains the molten glass G to a certain depth therein, and an evacuated upper space is formed in the vacuum degassing vessel. After that, the bypass is closed.

When the vacuum degassing apparatus 10 is preliminarily heated, the thermal expansion that is produced in the refractory bricks forming the paths can not be ignored since the refractory bricks are heated to about 1,200° C.–about 1,400° C. If the thermal expansion is left as it is, there is a possibility that the thermal distortion produced in the paths per se expands the gaps at joints the refractory bricks as the paths to shorten the life of the paths. In order to cope with this problem, when the vacuum degassing apparatus 10 is heated, the plural jacks 42, which are provided between the lower vacuum housing 12b and the thermal insulation material 30 under the horizontally provided vacuum degassing vessel 14, are operated to raise, through the steel plate 40, the vacuum degassing vessel 14 distorted in the vertical direction. If the thermal expansion in the vertical direction at the position B and the position B' shown in FIG. 1(a) is greater than the thermal expansion at the position C shown in FIG. 1(a) by, e.g., 5 mm in heating the vacuum degassing apparatus 10, the difference in the thermal expansion is canceled to cancel the shear distortion caused thereby by controllably operating the jacks 42 to raise the steel plate 40 by 5 mm corresponding to the difference. When heating the vacuum degassing apparatus 10 has completed, the jacks 42 are fixed by welding.

Since the vacuum degassing vessel 14 has a great length, the vacuum degassing vessel is thermally expanded to such an extent that the thermal expansion in the longitudinal direction can not be ignored in heating the vacuum degassing apparatus. Since the upper vacuum degassing vessel 14d is slidable, the upper vacuum degassing vessel can be extended by the thermal expansion, being subjected to the pressure from the Belleville springs 52. Thus, the thermal expansion produced in the longitudinal direction produces no thermal distortion in the upper vacuum degassing vessel 14d.

The uprising pipe 16 and the downfalling pipe 18 are not smoothly connected to the upper vacuum degassing vessel 14d before heating the vacuum degassing apparatus 10. However, when the vacuum degassing apparatus is heated, the upper vacuum degassing vessel 14d slides in the horizontal direction by the thermal expansion to smoothly connect the uprising pipe 16 and the downfalling pipe 18 to the upper vacuum degassing vessel 14d.

Although the uprising pipe 16 and the downfalling pipe 18 expands in the cross-sectional direction in heating the vacuum degassing apparatus 10, the thermal expansion of the uprising pipe and the downfalling pipe can be absorbed by the ceramic wool filled in the thermal expansion absorbing layers 48. As a result, the thermal expansion of the uprising pipe 16 and the downfalling pipe 18 in the cross-sectional direction produces no distortion. The gaps at joints of the refractory bricks forming the uprising pipe 16 and the downfalling pipe 18 are not expanded.

Thermal expansion is also produced in the width direction of the vacuum degassing vessel 14 in heating the vacuum degassing apparatus 10. This thermal expansion is absorbed by the ceramic wool, which is filled in the thermal expansion absorbing layers 49 provided at least the portions of the vacuum degassing vessel 14 in the height direction.

When heating the vacuum degassing apparatus 10 has been completed, the molten glass G passes through the upstream pit 22 from the melting vessel 20, and is drawn up through the uprising pipe 16 to be introduced into the vacuum degassing vessel 14. The molten glass G is degassed under a certain depressurized state while passing through the vacuum degassing vessel 14. Specifically, in the vacuum degassing vessel 14 under the certain depressurized state, the bubbles in the molten glass G rise in the molten glass G, and the risen bubbles are blocked by the barriers 36a and 36b and are broken there. Thus, the bubbles are eliminated from the molten glass G. The molten glass G thus degassed is discharged into the downfalling pipe 18 from the vacuum degassing vessel 14, flows downwardly in the downfalling pipe 18, is introduced into the downstream pit 24, and is discharged into the subsequent treatment vessel (not shown), such as a forming treatment vessel, from the downstream pit 24.

Although the vacuum degassing apparatus according to the present invention has been described in detail, the present invention is not limited to the embodiment stated above. It is apparent that, within the scope of the invention, modifications and different arrangements can be made other than as herein disclosed.

As explained in detail, the present invention can provide a vacuum degassing apparatus, which includes at least one of the thermal expansion absorbers therein to absorb thermal expansion of a path produced by heating the vacuum degassing apparatus and thermal distortion caused by the thermal expansion, extending the life of the path.

What is claimed is:

1. A vacuum degassing apparatus for molten glass, comprising
    a vacuum housing which is evacuated to be depressurized therein;
    a vacuum degassing vessel assembled by combining a plurality of refractory bricks in the vacuum housing;
    an uprising pipe assembled by combining a plurality of refractory bricks, the uprising pipe communicating with the vacuum degassing vessel in the vacuum housing to suck and draw up undegassed molten glass and to introduce the molten glass into the vacuum degassing vessel;

a downfalling pipe assembled by combining a plurality of refractory bricks, the downfalling pipe communicating with the vacuum degassing vessel in the vacuum housing to draw down and take out the degassed molten glass; and a thermal expansion absorber, wherein said thermal expansion absorber comprises a path slider for freely sliding at least one portion of the vacuum degassing vessel in a longitudinal direction of the vacuum degassing vessel so as to absorb thermal expansion of the vacuum degassing vessel in the longitudinal direction of the vacuum degassing vessel.

2. The apparatus according to claim 1, which further comprises a thermal expansion absorber for absorbing thermal expansion in at least one of the uprising pipe and the downfalling pipe.

3. The apparatus according to claim 2, wherein the thermal expansion absorber for absorbing thermal expansion of at least one of the uprising pipe and the downfalling pipe comprises a thermal expansion absorbing layer provided around said at least one of the uprising pipe and the downfalling pipe and wherein the thermal expansion absorbing layer comprises filled ceramic fibers.

4. The apparatus according to claim 1, which further comprises a lifter for lifting at least one portion of the vacuum degassing vessel in accordance with an amount of the thermal expansion so as to absorb thermal expansion of the vacuum degassing vessel in a substantially vertical direction, the vacuum degassing vessel being provided in a substantially horizontal direction.

5. The apparatus according to claim 1, which further comprises a thermal expansion absorbing layer provided along a portion of an outer surface of the vacuum degassing vessel in a height direction to absorb thermal expansion of the vacuum degassing vessel at said portion, the thermal expansion absorbing layer comprising filled ceramic fibers.

6. The apparatus according to claim 2, which further comprises a lifter for lifting at least one portion of the vacuum degassing vessel in accordance with an amount of the thermal expansion so as to absorb thermal expansion of the vacuum degassing vessel in a substantially vertical direction, the vacuum degassing vessel being provided in a substantially horizontal direction.

7. The apparatus according to claim 3, which further comprises a lifter for lifting at least one portion of the vacuum degassing vessel in accordance with an amount of the thermal expansion so as to absorb thermal expansion of the vacuum degassing vessel in a substantially vertical direction, the vacuum degassing vessel being provided in a substantially horizontal direction.

8. The apparatus according to claim 2, which further comprises a thermal expansion absorbing layer provided along a portion of an outer surface of the vacuum degassing vessel in a height direction to absorb thermal expansion of the vacuum degassing vessel at said portion, the thermal expansion absorbing layer comprising filled ceramic fibers.

9. The apparatus according to claim 3, which further comprises a thermal expansion absorbing layer provided along a portion of an outer surface of the vacuum degassing vessel in a height direction to absorb thermal expansion of the vacuum degassing vessel at said portion, the thermal expansion absorbing layer comprising filled ceramic fibers.

10. The apparatus according to claim 4, which farther comprises a thermal expansion absorbing layer provided along a portion of an outer surface of the vacuum degassing vessel in a height direction to absorb thermal expansion of the vacuum degassing vessel at said portion, the thermal expansion absorbing layer comprising filled ceramic fibers.

* * * * *